3,314,893
GROUP II METAL-THORIUM PHOSPHATE
PHOSPHORS
Mary V. Hoffman, South Euclid, Ohio, assignor to General Electric Company, a corporation of New York
Filed Jan. 3, 1966, Ser. No. 518,363
8 Claims. (Cl. 252—301.1)

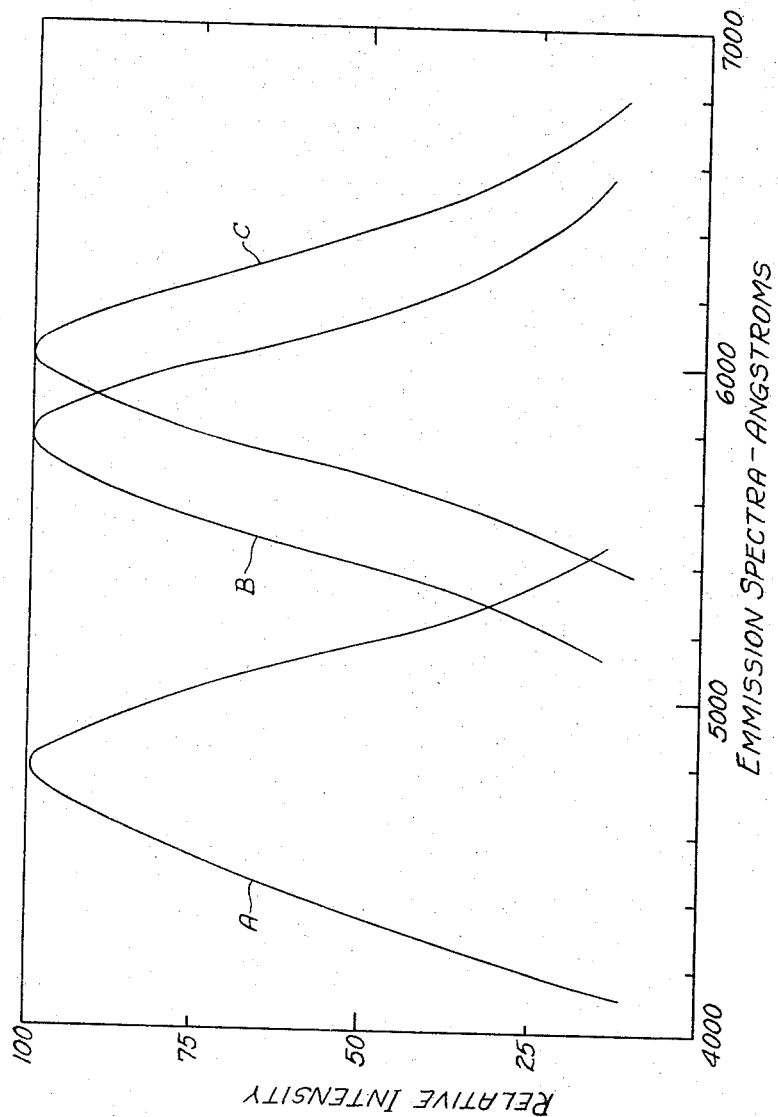

The present invention relates to newly discovered phosphors or luminescent materials, and more particularly to phosphors based on compounds of certain Group II metals with thorium phosphate.

Copper thorium phosphate in which copper is a self-activator as well as being a constituent of the host lattice is known to be fluorescent. However, from the prior art it cannot be predicted which, if any, other compounds containing thorium and phosphate radicals as part of their composition would produce phosphors.

An object of the present invention is to provide novel and useful phosphors based on compounds of thorium, the phosphate radical and one or two other elements plus certain activators.

Another object of the invention is to provide novel and useful luminescent materials with emission characteristics suiting them for particular application needs that may arise.

Further objects and advantages of the invention will appear from the following detailed description of species thereof and from the accompanying drawing.

The sole figure of the drawing is a graph of the emission spectra of some phosphors of the invention.

The present invention provides, in one aspect, phosphors based on thorium phosphate compounds with certain elements from Group II of the Periodic Table of the Elements, activated with certain metals. The Group II metals found to be useful in producing compounds include calcium, strontium, barium, magnesium and zinc. Of these ternary compounds (considering the phosphate radical as one constituent) using these metals, the compounds containing calcium, zinc and magnesium were found to give usable phosphors. Certain of the quaternary compounds using two of the Group II metals were found to form fluorescent compounds. These are zinc-barium-thorium phosphate, magnesium-barium-thorium phosphate and magnesium-strontium-thorium phosphate. It should be borne in mind that the compounds discussed here are true compounds centering on the stoichiometric compositions but tolerating small deviations in proportions of each of the components. Divalent tin and divalent manganese and, to a lesser extent, terbium, dysprosium and uranium are useful activators in these phosphors, with optimum concentrations normally about 0.05 moles of activator per mole of host matrix. The phosphors of the present invention include the following:

$CaThP_2O_8:Sn$
$ZnThP_2O_8:Sn$
$ZnThP_2O_8:Mn$
$MgThP_2O_8:Sn$
$MgThP_2O_8:Mn$
$MgSrTh_2P_4O_{16}:Sn$
$MgSrTh_2P_4O_{16}:Mn$
$ZnBaTh_2P_4O_{16}:Mn$
$MgBaTh_2P_4O_{16}:Mn$

Stated differently, the present invention provides a metal thorium phosphate phosphor selected from the group consisting of:

$MTh_2O_8$ wherein M is a metal selected from the group consisting of calcium, magnesium and zinc, and $MM'Th_2P_4O_{16}$ wherein M is a metal selected from the group consisting of magnesium and zinc, when M is zinc, M' is barium, and when M is magnesium, M' is a metal selected from the group consisting of barium and strontium, said phosphor being activated by at least one element selected from the group consisting of divalent tin, divalent manganese, terbium, dysprosium and uranium.

More specifically, it provides a metal thorium phosphate phosphor selected from the group consisting of:

$MThP_2O_8$ activated by at least one element selected from the group consisting of divalent tin and divalent manganese, and wherein M is a metal selected from the group consisting of calcium, magnesium and zinc, and $MM'Th_2P_4O_{16}$ activated by at least one element selected from the group consisting of divalent tin and divalent manganese, and wherein M is a metal selected from the group consisting of magnesium and zinc, when M is zinc, M' is barium, and when M is magnesium, M' is a metal selected from the group consisting of barium and strontium.

Preferred composition ranges basically equivalent to the stoichiometric formula $MThP_2O_8$ but with varying resulting brightnesses, can be expressed as:

$x$ MO:$y$ ThO$_2$:$z$ P$_2$O$_5$
$x=0.20$ to $0.35$ moles
$y=0.30$ to $0.45$ moles
$z=0.30$ to $0.38$ moles where $x+y+z=1.0$.

Similarly, in the quaternary compounds, preferably:

$a$ MO:$b$ M'O:$c$ ThO$_2$:$d$ P$_2$O$_5$
$a+b=0.25$ to $0.35$ moles
$a=0.125$ to $0.175$ moles
$b=0.125$ to $0.175$ moles
$c=0.32$ to $0.40$ moles
$d=0.30$ to $0.37$ moles where $a+b+c+d=1$. As an optimum, $a=0.17$, $b=0.15$, $c=0.34$, and $d=0.34$.

In these formulae, $Sn^{+2}$ and $Mn^{+2}$ substitute for M, M', or M plus M'. Thus, in the above ranges, $$x = MO + SnO + MnO$$

and $$a+b = MO + M'+ SnO + MnO$$

The divalent tin content is preferably from 0.003 to 0.04 moles, with an optimum of about 0.015 moles. The divalent manganese content is preferarbly from 0.003 to 0.05 moles with an optimum of about 0.015 moles in the ternary compounds and from 0.008 to 0.010 moles in the quaternary compounds.

When the other activators terbium, dysprosium or uranium are used, their valences may differ, and they may substitute for different elements in the phosphor.

Although the compound $CaThP_2O_8$ has previously been reported, it has not been known to be a useful phosphor when activated such as with divalent tin or manganese. The other compounds that have been found to be the basis of useful phosphors in the present invention have not previously been known as such, or in the form of phosphors, so far as I am aware.

The ternary compounds were proven to exist by determining compatibility triangles by usual methods known in the art. The compounds present were identified by X-ray diffraction and differential thermal analysis. However, for the quaternary compounds, special approaches were used as described below.

Each of these Group II metal thorium phosphate compounds were prepared as described hereinafter using CaO with ThO$_2$ and (NH$_4$)$_2$HPO$_4$ to form CaThP$_2$O$_8$, and analogous Group II metal oxides for the other compounds, namely SrO, BaO, MgO and ZnO. The compounds were then used in equi-molar ratios to determine the possibility of synthesizing various quaternary compounds between the systems. This was done by physically blending the fired materials and then re-firing them at 1150° C. for 16 hours. For example, equi-molar quantities of $BaThP_2O_8$ and $ZnThP_2O_8$ were combined and $ZnBaTh_2P_4O_{16}$ was found to have formed during firing. X-ray diffraction patterns were obtained on each of the fired quaternary compositions. The results of these tests are given in Table I.

TABLE I.—QUATERNARY GROUP II THORIUM PHOSPHATES

| No Reaction Found | Probable Interaction | Compound Formation |
|---|---|---|
| Ca+Sr<br>Ca+Ba<br>Ca+Mg<br>Sr+Ba<br>Sr+Zn | Sr+Mg<br>Zn+Mg | Ba+Zn<br>Ba+Mg |

In the instances in which no reaction was found, quaternary compounds did not form. The equi-molar ratios of $ZnBaTh_2P_4O_{16}$ and $MgBaTh_2P_4O_{16}$ were verified by using other molar ratios in attempted synthesis. In each case, a ternary end member was found by X-ray diffraction, indicating that the formulas given are correct. The Sr+Mg reaction product formed a definite compound upon heating at higher temperatures, and this compound formed a phosphor with activation. The Zn+Mg reaction product did not appear to be a single compound.

X-ray diffraction data are given in Table II for certain of the compounds formed to permit more positive identification of the compounds. In the table, $d$ is the interplanar spacing on the various planes indicated as determined from the Bragg's equation, and $I/I_o$ is the relative intensity from the various interplanar spacings, normalized to the relative intensity of the highest peak as 100. The X-ray diffraction pattern of $CaThP_2O_8$ is reported in the ASTM X-ray Powder Data File.

TABLE II.—X-RAY DATA FOR THORIUM PHOSPHATE COMPOUNDS

| $ZnThP_2O_8$ | | $SrThP_2O_8$ | | $BaThP_2O_8$ | |
|---|---|---|---|---|---|
| d | I/Io | d | I/Io | d | I/Io |
| 5.47 | 60 | 5.53 | 15 | 6.28 | 30 |
| 4.60 | 100 | 4.82 | 10 | 5.01 | 8 |
| 3.95 | 20 | 4.46 | 20 | 4.25 | 50 |
| 3.86 | 35 | 4.19 | 40 | 4.19 | 30 |
| 3.45 | 5 | 4.07 | 10 | 3.55 | 5 |
| 2.97 | 100 | 3.55 | 15 | 3.39 | 50 |
| 2.86 | 5 | 3.50 | 15 | 3.31 | 100 |
| 2.73 | 40 | 3.31 | 70 | 3.13 | 20 |
| 2.54 | 40 | 3.10 | 100 | 2.73 | 100 |
| 2.44 | 10 | 2.99 | 20 | 2.27 | 20 |
| 2.35 | 45 | 2.89 | 100 | 2.12 | 30 |
| 2.30 | 5 | 2.61 | 20 | 2.08 | 35 |
| 2.25 | 3 | 2.45 | 20 | 2.06 | 20 |
| 2.01 | 30 | 2.19 | 20 | 2.03 | 30 |
| 1.98 | 15 | 2.16 | 20 | | |
| | | 2.14 | 25 | | |

| $ZnBaTh_2P_4O_{16}$ | | $MgBaTh_2P_4O_{16}$ | | $MgThP_2O_8$ | |
|---|---|---|---|---|---|
| d | I/Io | d | I/Io | d | I/Io |
| 8.66 | 15 | 8.58 | 15 | 5.43 | 100 |
| 6.40 | 35 | 6.37 | 40 | 4.46 | 30 |
| 5.18 | 25 | 5.85 | 25 | 4.31 | 20 |
| 4.82 | 25 | 4.81 | 30 | 4.07 | 75 |
| 4.42 | 50 | 4.41 | 55 | 4.00 | 25 |
| 4.31 | 10 | 4.29 | 20 | 3.80 | 10 |
| 4.00 | 40 | 4.25 | 30 | 3.63 | 15 |
| 3.53 | 20 | 4.17 | 15 | 3.56 | 10 |
| 3.44 | 5 | 3.98 | 10 | 3.53 | 15 |
| 3.37 | 25 | 3.50 | 30 | 3.22 | 15 |
| 3.28 | 65 | 3.37 | 50 | 3.06 | 25 |
| 3.22 | 25 | 3.29 | 100 | 2.91 | 15 |
| 3.05 | 100 | 3.21 | 30 | 2.82 | 60 |
| 2.87 | 40 | 3.13 | 10 | 2.74 | 15 |
| 2.75 | 40 | 3.04 | 100 | 2.72 | 20 |
| 2.71 | 5 | 2.86 | 40 | 2.69 | 15 |
| 2.65 | 5 | 2.75 | 30 | 2.55 | 15 |
| 2.45 | 25 | 2.72 | 50 | 2.53 | 10 |
| | | | | 2.44 | 10 |
| | | | | 2.32 | 20 |
| | | | | 2.27 | 10 |

The materials used in these tests were: American Potash Co. Code No. 115 $ThO_2$, U.S.P. grade $(NH_4)_2HPO_4$ and the alkaline earth phosphates $CaHPO_4$ and $BaHPO_4$ prepared as standard phosphor intermediate materials. $ZnNH_4PO_4$ and $MgNH_4PO_4 \cdot HO$ were prepared by conventional methods known in the art. For the activators, SnO or $SnO_2$ ($Sn^{+4}$ converts to $Sn^{+2}$ during the firing in the reducing atmosphere), $MnCO_3$, $Tb_4O_7$, $Dy_2O_3$ and uranium acetate may be used. These were ball-milled uranium acetate may be used. These were ballmilled and usually fired at temperatures ranging from 300° C. to 600° C., to decompose the $(NH_4)_2HPO_4$ and start the reaction.

The best firing conditions for these phosphors were found to be a double firing, each at about 1100° C. The first firing was in air, for four hours. Preferably, the second firing for tin-activated phosphors, was in a mildly reducing atmosphere which may be 0.5 to 1.0% $H_2$ in $N_2$. This atmosphere may be further modified by adding small amounts of water vapor. Except with tin-activated phosphors, firing may be done in air.

Phosphors found are summarized in Table III with fluorescent emission in response to 2537 A. and cathode ray activation, and representative spectral curves are shown in the drawing.

TABLE III.—FLUORESCENCE

| Phosphor | 2537 A. Response (A.) | Cathode Ray Response (A.) |
|---|---|---|
| $CaThP_2O_8$:Sn | 4700 | [1] 4700 |
| $MgThP_2O_8$:Sn | 4700 | None |
| $ZnThP_2O_8$:Sn | 4700 | None |
| $MgThP_2O_8$:Mn | None | 6010 |
| $ZnThP_2O_8$:Mn | None | [1] 6010 |
| $ZnBaTh_2P_4O_{16}$:Mn | None | 5770 |
| $MgBaTh_2P_4O_{16}$:Mn | None | [1] 5770 |
| $MgSrTh_2P_4O_{16}$:Mn | None | [1] 6010 |
| $MgSrTh_2P_4O_{16}$:Sn | None | [1] 4700 |

[1] Estimated by visual comparison

Fluorescence of less brightness was found with other activators including terbium (blue-green), dyprosium (white), and uranium (green), in most of these matrices. Additions of other elements normally used as activators to the already activated phosphors did little to modify the fluorescence.

The best fluorescence was found with a composition of $CaThP_2O_8$:Sn slightly in excess in $ThO_2$ and $P_2O_5$. The composition used to evaluate this phosphor, considered about optimum as an example for the ternary compounds, consisted of 27 mole percent CaO, 38 mole percent $ThO_2$ and 35 mole percent $P_2O_5$. The tin concentration was 0.05 mole tin per mole of $CaThP_2O_8$. Variations in composition were made with partial substitutions of SrO, BaO and $ZrO_2$. The first two somewhat reduced the brightness, while $ZrO_2$ seemed to have little effect. Additions of second activator ions did not visually change the fluorescence under 2537 A. in color or brightness.

This phosphor is responsive to 2537 A. radiation and cathode ray excitation. Under 2537 A. radiation, the phosphor has a sharp emission band peaking at 4700 A. and a half-width of 800 A. Light output data were obtained with this phosphor in 40-watt lamps operated under normal testing conditions and prepared under normal lamp making conditions. The data is presented in Table IV. LPW means lumens per watt and $x$ and $y$ are the ICI color coordinates.

TABLE IV.—CaThP$_2$O$_8$=Sn LAMP DATA

| Hr. | | | 100 Hr. | | | 500 Hr. | |
|---|---|---|---|---|---|---|---|
| Lumens | LPW | x/y | Lumens | LPW | x/y | Lumens | LPW |
| 964 | 23.8 | .153/.159 | 761 | 19.5 | .156/.167 | 678 | 17.3 |

The ZnThP$_2$O$_8$:Sn and MgThP$_2$O$_8$:Sn phosphors were prepared with approximately the same compositional relationship as the CaThP$_2$O$_8$:Sn phosphor. Spectral distribution curves show that all three phosphors have the same emission under 2537 A. excitation, as shown by curve A in the drawing. The brightness of the ZnThP$_2$O$_8$:Sn phosphor is about 70% that of the CaThP$_2$O$_8$:Sn phosphor.

The MgThP$_2$O$_8$:Mn and ZnBaTh$_2$P$_4$O$_{16}$:Mn phosphors were measured for spectral distribution and brightness under cathode ray excitation. As shown in Table III above, similar compositions respond with the same emissions: the ternary compounds MgThP$_2$O$_8$:Mn and ZnThP$_2$O$_8$:Mn at 6010 A. as indicated by curve C in the drawing, and the quaternary compounds ZnBaTh$_2$P$_4$O$_{16}$ and MgBaTh$_2$P$_4$O$_{16}$:Mn at 5770 A., curve B.

MgThP$_2$O$_8$:Mn and ZnBaTh$_2$P$_4$O$_{16}$:Mn were measured. Both have a narrow emission band, with a half-width of about 750 A. MgThP$_2$O$_8$:Mn has a brightness of 14.3 ft. lamberts and ZnBaTh$_2$P$_4$O$_{16}$:Mn, a brightness of 15.1 ft. lamberts, both at 16 kilovolt excitation with 1.0 microampere per square centimeter.

While specific examples have been given of phosphors of the present invention, it will be understood that various changes, omissions and substitutions may be made within the true spirit and scope of the invention as defined in the appended claims.

What I claim as new and desire to secure by Letters Patent of the United States is:

1. A metal thorium phosphate phosphor selected from the group consisting of:
   MThP$_2$O$_8$ wherein M is a metal selected from the group consisting of calcium, magnesium and zinc, and
   MM'Th$_2$P$_4$O$_{16}$ wherein M is a metal selected from the group consisting of magnesium and zinc, when M is zinc, M' is barium, and when M is magnesium, M' is a metal selected from the group consisting of barium and strontium,
   said phosphor being activated by at least one element selected from the group consisting of divalent tin, divalent manganese, terbium, dysprosium and uranium.

2. A metal thorium phosphate phosphor according to claim 1 selected from the group consisting of:
   MThP$_2$O$_8$ activated by at least one element selected from the group consisting of divalent tin and divalent manganese, and wherein M is a metal selected from the group consisting of calcium, magnesium and zinc, and
   MM'Th$_2$P$_4$O$_{16}$ activated by at least one element selected from the group consisting of divalent tin and divalent manganese, and wherein M is a metal selected from the group consisting of magnesium and zinc, when M is zinc, M' is barium, and when M is magnesium, M' is a metal selected from the group consisting of barium and strontium.

3. Calcium thorium phosphate phosphor according to claim 1 activated with divalent tin.

4. Magnesium thorium phosphate phosphor according to claim 1 activated with at least one element selected from the group consisting of divalent tin and divalent manganese.

5. Zinc thorium phosphate phosphor according to claim 1 activated with at least one element selected from the group consisting of divalent tin and divalent manganese.

6. Zinc barium thorium phosphate phosphor according to claim 1 activated with divalent manganese.

7. Magnesium barium thorium phosphate phosphor according to claim 1 activated with divalent manganese.

8. Magnesium strontium thorium phosphate phosphor according to claim 1 activated with at least one element selected from the group consisting of divalent tin and divalent manganese.

References Cited by the Examiner

UNITED STATES PATENTS

| 2,455,413 | 12/1948 | Froelich et al. | 252—301.4 |
| 2,455,414 | 12/1948 | Froelich et al. | 252—301.4 |
| 2,455,415 | 12/1948 | Froelich et al. | 252—301.4 |
| 2,488,719 | 11/1949 | Froelich et al. | 252—301.4 |
| 3,049,497 | 8/1962  | Ranby et al.    | 252—301.4 |

CARL D. QUARFORTH, *Primary Examiner.*

S. J. LECHERT, Jr., *Assistant Examiner.*